(12) United States Patent
Okumura et al.

(10) Patent No.: US 7,690,961 B2
(45) Date of Patent: Apr. 6, 2010

(54) PLASMA DISPLAY PANEL AND PROCESS FOR PRODUCING THE PLASMA DISPLAY PANEL

(75) Inventors: Tomohiro Okumura, Kadoma (JP); Mitsuo Saitoh, Neyagawa (JP); Masashi Morita, Minoo (JP); Takafumi Okuma, Hirakata (JP); Masaharu Terauchi, Nara (JP); Junko Asayama, Suita (JP)

(73) Assignee: Panasonic Corporation, Osaka (JP)

( * ) Notice: Subject to any disclaimer, the term of this patent is extended or adjusted under 35 U.S.C. 154(b) by 327 days.

(21) Appl. No.: 11/802,862

(22) Filed: May 25, 2007

(65) Prior Publication Data

US 2007/0232181 A1  Oct. 4, 2007

Related U.S. Application Data

(62) Division of application No. 10/920,399, filed on Aug. 18, 2004, now Pat. No. 7,329,989.

(30) Foreign Application Priority Data

Aug. 22, 2003 (JP) .............................. 2003-298481
Jul. 30, 2004 (JP) .............................. 2004-223717

(51) Int. Cl.
     *H01J 9/00*   (2006.01)
(52) U.S. Cl. ...................................................... 445/24
(58) Field of Classification Search ............. 445/23–25; 313/504–506
See application file for complete search history.

(56) References Cited

U.S. PATENT DOCUMENTS 4,297,584 A  10/1981  Buchanan et al.

FOREIGN PATENT DOCUMENTS

| JP | 5-314912 | 11/1993 |
|---|---|---|
| JP | 7-320645 | 12/1995 |
| JP | 10-228868 | 8/1998 |
| JP | 2001-200249 | 7/2001 |

*Primary Examiner*—Joseph L Williams
(74) *Attorney, Agent, or Firm*—Wenderoth, Lind & Ponack L.L.P.

(57) ABSTRACT

A fluorine-containing precoating is formed to cover a phosphor particle by, for example, a physical vapor deposition of a fluoride. Then, a fluorine-containing coating covering the phosphor particle is formed by supplying fluorine into the precoating. This obtained phosphor particle with the coating is applied in the form of a paste to a substrate on each electrode between two adjacent ribs to form a phosphor layer including phosphor particles between the ribs on the substrate. The substrate is positioned with respect to another substrate having electrodes thereon to form discharge spaces between the substrates. The discharge spaces are filled with a discharge gas to produce a plasma display panel.

12 Claims, 7 Drawing Sheets

PLASMA DISPLAY PANEL AND PROCESS FOR PRODUCING THE PLASMA DISPLAY PANEL

This is a divisional of U.S. application Ser. No. 10/920,399, filed Aug. 18, 2004 now U.S. Pat. No. 7,329,989.

CROSS-REFERENCE TO RELATED APPLICATIONS

The present application claims priorities under 35 U.S.C. §119 to Japanese Patent Application No. 2003-298481 filed on Aug. 22, 2003, entitled "PROCESS FOR PRODUCING PLASMA DISPLAY PANEL AND PLASMA DISPLAY PANEL AND THIN FILM" and Japanese Patent Application No. 2004-223717 filed on Jul. 30, 2004, entitled "PLASMA DISPLAY PANEL AND PROCESS FOR PRODUCING THE SAME AND THIN FILM." The contents of these applications are incorporated herein by reference thereto in their entirety.

BACKGROUND OF THE INVENTION

1. Field of the Invention

The present invention relates to a plasma display panel (hereinafter referred to as PDP) which is used for displaying images on a television set, a computer or the like, and a process for producing such a plasma display panel, and also a thin film which is preferably used for covering a phosphor (or fluorescent) substance.

2. Description of Related Art

Figure 11:
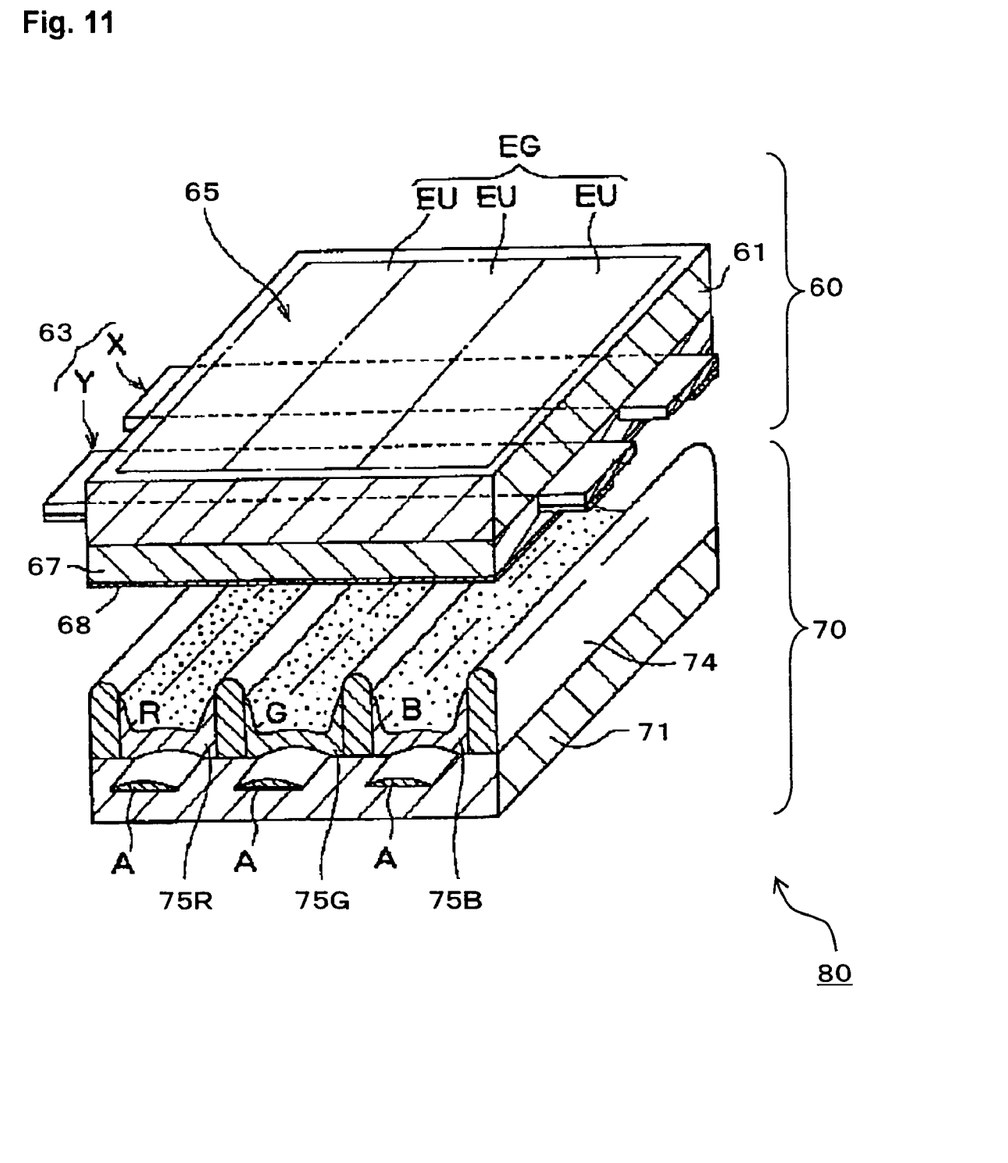
FIG. 11 schematically shows a perspective view of structure of a conventional PDP.

As is generally known in the art, a PDP is a self-emitting display which emits light by irradiating a phosphor substance with an ultraviolet (UV) ray generated by discharging a gas contained between a pair of substrates. For example, a surface discharge type PDP with a three electrode structure is shown in FIG. 11. (See Japanese Patent Kokai Publication No. H7-320645.) This PDP 80 has a front plate 60 and a rear plate 70 which are opposed to each other. The front plate 60 has a front substrate 61 and provided on an inner surface of the substrate 61 is an electrode pair 63 consisting of a pair of display electrodes "X" and "Y" adjacent and parallel to each other, and a dielectric layer 67 and a protective film 68 which cover the electrode pair. An outer surface of the front substrate 61 is a display surface 65. On the other hand, the rear plate 70 has a rear substrate 71 and provided on an inner surface of the substrate 71 are address electrodes "A" located in a direction perpendicular to the electrode pair 63, a plurality of ribs 74 projecting toward the front plate 60 while each address electrode "A" is between two adjacent ribs 74, and a phosphor layer 75 (75R, 75G, 75B) which covers a surface of the rear substrate 71 and the address electrodes "A" thereon between the ribs 74. A discharge space is formed between the front plate 60 and the rear plate 70 and filled with a discharge gas. Among these three electrodes "X", "Y", and "A", the display electrodes "X" and "Y" delimit a surface discharge cell (a main discharge cell for display), and the display electrode "X" and the address electrode "A" delimit an address discharge cell for selecting an on or off state with respect to a unit emitting region "EU". An ultraviolet ray generated by surface discharge between the display electrodes "X" and "Y" excites a phosphor substance in the phosphor layer 75, more specifically phosphor particles (not shown) to emit light.

In a case of a full color display, phosphor layers 75R, 75G, and 75B which have additive primary colors of red, green and blue are applied to constitute one pixel "EG" by the unit emitting regions "EU" of red, green, and blue. The phosphor layers 75R, 75G, and 75B are generally formed by applying a paste containing phosphor particles as a major component to the rear substrate 71 between the ribs with a screen printing method with respect to each color in sequence, followed by firing or baking of this obtained rear substrate 71.

As a red phosphor substance for the red phosphor layer 75R, a particulate material made of, for example, $Y_2O_3$: Eu having an average diameter of about 3 μm is used. As a green phosphor substance for the green phosphor layer 75G, a particulate material made of, for example, $BaO.Al_2O_3$:Mn having an average diameter of about 3 μm is used. As a blue phosphor substance for the blue phosphor layer 75B, a particulate material made of, for example, $3(Ba, Mg)O.8Al_2O_3$: Eu having an average diameter of about 5 μm is used.

With respect to such a PDP, it is known to cover each phosphor particle with a film such as magnesium fluoride, calcium fluoride, barium fluoride or silicon oxide for various purposes. Procedures for forming the film are generally classified into two categories, a gas phase process (such as physical vapor deposition and chemical vapor deposition) and a liquid phase process (such as a solution method and a melt method).

For example, in an attempt to realize a higher luminescence and improve visibility and color reproducibility of a PDP, it is proposed to cover each phosphor particle with a thin film of a light-transmittance material having a refractive index lower than that of the phosphor particle, more specifically with a thin film of magnesium fluoride, silicon dioxide, alumina or the like. (See Japanese Patent Kokai Publication No. H7-320645.) This thin film is formed by a micro-encapsulation procedure such as evaporation, dipping, sputtering, and spraying methods.

For a purpose of realizing high emission efficiency of a PDP, it is proposed to cover each phosphor particle with an anti-reflection film, more specifically a film of magnesium fluoride, calcium fluoride, barium fluoride, silicon oxide or the like in order to decrease an amount of an ultraviolet ray which is lost by reflection at a surface of the phosphor particle. (See Japanese Patent Kokai Publication No. H10-228868.) The anti-reflection film is formed by chemical vapor deposition (CVD) or physical vapor deposition (PVD), or formed by preparing a suspension of phosphor particles in a dielectric melt and then pouring the suspension gently over a surface, e.g. a substrate.

In order to prevent degradation of luminance due to oxidation of the phosphor, it is also proposed to impart an oxidation resistance to the phosphor particle by coating the phosphor particle with magnesium fluoride or calcium fluoride. (See Japanese Patent Kokai Publication No. 2001-200249.) This coating film is formed by suspending phosphor particles in a solution and chemically depositing magnesium fluoride or calcium fluoride onto a surface of the phosphor particles.

For a higher luminance and a longer lifetime, it is proposed to cover each phosphor particle with a film of a dielectric material having a small loss due to absorbing an ultraviolet ray such as a fluoride of an alkaline metal or an alkaline-earth metal, e.g. a magnesium fluoride film, and to provide on this film an additional film having a higher secondary electron emission rate, e.g. a magnesium oxide film. (See Japanese Patent Kokai Publication No. H5-314912.) Methods for forming these films are not specified therein.

It is important for suppressing degradation of luminance which occurs during use of a PDP to prevent deterioration or degradation of the phosphor due to transformation thereof which is caused by irradiating the phosphor particles with a plasma (operative degradation). It is important for obtaining a higher luminance (or a higher emission efficiency) to supply a greater amount of an ultraviolet ray into the phosphor particle during use of the PDP. It is also important for higher luminance to prevent deterioration of the phosphor due to transformation which is caused by subjecting the phosphor particles to a gas containing moisture, oxygen and the like under a high temperature during sealing of the front plate and the rear plate in a process of manufacturing the PDP (process degradation) (for example, $Eu^{2+}$ in the blue phosphor is transformed into $Eu^{3+}$ by oxidation in presence of moisture). That is, the film for coating the phosphor particle needs to have a high UV transmittance and a high resistance (or protective property) to moisture, oxygen and plasma, especially to moisture.

In the prior art as described above, it is technically difficult and highly costly to form the film of fluoride, such as magnesium fluoride, by a liquid phase method.

On the other hand, when the fluoride film is formed by a general gas phase method the present inventors have found problems in that the film has a poor UV transmittance thereof and thus a luminance is lowered contrary to a purpose of obtaining a higher luminance. Results of tests by the inventors proved that when the fluoride film was formed by physical vapor deposition such as vacuum deposition and sputtering, and especially by sputtering, this obtained film had a brown color and a low UV transmittance. Conventional transparent films are not formed of a fluoride, such as a magnesium fluoride by a gas phase method.

In addition, since the fluoride is hygroscopic, the fluoride is not necessarily a sufficient material for coating a phosphor particle.

SUMMARY OF THE INVENTION

The present invention aims to provide a novel PDP and a process for producing the same while seeking a high quality material for a thin film having a high UV transmittance and a high water resistance which are suitable for coating a phosphor particle.

Poor UV transmittance of a fluoride film obtained by a gas phase method in the prior art, as described above, is due to a lower fluorine content in this obtained film than that of a stoichiometric composition of the fluoride even though a fluoride in or near a stoichiometric composition (e.g. MgF2) is used as an evaporation or sputtering source. Then, it was found that UV transmittance of such fluoride film can be improved by an additional step for supplying fluorine to the fluoride film, and thereby a coating having a sufficient UV transmittance and water resistance can be realized.

Furthermore, the step for supplying fluorine can be conducted not only into the fluoride film but also directly into a phosphor particle. A coating having a sufficient UV transmittance and water resistance can be realized in the latter case as well.

In addition, other materials having a sufficient UV transmittance and water resistance were studied, and a conclusion was reached that a silicon based material is available.

In one aspect of the present invention, there is provided a process for producing a PDP having a phosphor layer containing phosphor particles on a substrate, which process includes forming a fluorine-containing coating (also referred to as merely a "coating" in the present invention) which covers at least a part of a surface of a phosphor particle by supplying fluorine to the phosphor particle.

According to such a process of the present invention, it can be realized to provide a fluorine-containing coating which exhibits higher protection from an environment such as moisture, oxygen, plasma and the like, especially for a higher water resistance, and has a higher UV transmittance. Since the phosphor particle is at least partially covered with such coating in the PDP produced by the present invention, this obtained PDP has a higher luminance and a suppressed degradation of luminance compared with a PDP using an uncovered phosphor particle.

More specifically, there is provided a process for producing a PDP including:
 forming a fluorine-containing coating to cover a surface of each of phosphor particles by supplying fluorine to the phosphor particles,
 forming electrodes and ribs on a substrate so that each electrode is between two adjacent ribs on the substrate,
 applying the phosphor particles in the form of a paste to the substrate to form a phosphor layer, including the phosphor particles covered with the coating, between the ribs on the substrate,
 positioning the substrate with respect to another substrate having electrodes thereon to form discharge spaces between the substrates, and
 filling the discharge spaces with a discharge gas.

There is also provided a process for producing a PDP including:
 forming electrodes and ribs on a substrate so that each electrode is between two adjacent ribs on the substrate,
 applying phosphor particles in the form of a paste to the substrate to form a phosphor layer including the phosphor particles between the ribs on the substrate,
 forming a fluorine-containing coating to cover a surface of the phosphor layer by supplying fluorine to the phosphor layer of the substrate,
 positioning the substrate with respect to another substrate having electrodes thereon to form discharge spaces between the substrates, and
 filling the discharge spaces with a discharge gas.

In the present invention, supply of fluorine can be conducted in a gas phase, more specifically by heating the phosphor particles or the phosphor layer in a gas phase including fluorine gas or by irradiating the phosphor particles or the phosphor layer with a plasma including fluorine radicals. During this step, the phosphor particles may or may not be in the form of free and unfixed particles only, or in the form of the phosphor layer, and the phosphor particles may or may not be covered with a precoating described hereinafter.

According to this process of the present invention, a fluorine content in the coating can be decreased in a direction from an exposed surface of the coating toward an inside of the coating (or inside of a covered particle) by supplying fluorine to the phosphor particles.

If a large amount of fluorine atoms exists in a region of the coating neighboring a bulk of the phosphor particle, the fluorine atoms diffuse into the phosphor particle to transform the phosphor during a process for producing a PDP and possibly during operation of the PDP with time. As a result, a luminance of the PDP is degraded and a wavelength of a light emitted from the phosphor is shifted. In the coating formed in the present invention, on the other hand, an amount of fluorine atoms existing in a region of the coating near the phosphor particle is smaller than that in a surface portion of the coating, so that diffusion of fluorine atoms into the phosphor particle is effectively suppressed. Therefore, it is possible to obtain a higher luminance and a smaller shift in a wavelength of light emitted from the phosphor. It is noted that the present inventors have confirmed that a sufficient UV transmittance and a water resistance are achieved when a high content of fluorine is obtained at least a surface of the coating.

In another aspect of the present invention, there is provided the PDP having the phosphor layer containing the phosphor particles on the substrate, wherein at least a part of the surface of the phosphor particle is covered with the fluorine-containing coating, and a fluorine content in the coating decreases from the surface of the coating toward the inside of the phosphor particle. This PDP has advantages as described above.

More specifically, there is provided a PDP including:
a rear plate having a substrate, electrodes, ribs, and a phosphor layer, wherein each electrode is between two adjacent ribs on the substrate, the phosphor layer is between the ribs on the substrate and includes phosphor particles, a fluorine-containing coating covers a surface of each of the phosphor particles, and a fluorine content in the coating decreases in a direction from an exposed surface of the coating toward an inside of the coating, and
a front plate having a substrate and electrodes on the substrate and positioned to form discharge spaces filled with a discharge gas between the front and the rear plates.

There is also provided a PDP including:
a rear plate having a substrate, electrodes, ribs, and a phosphor layer, wherein each electrode is between two adjacent ribs on the substrate, the phosphor layer is between the ribs on the substrate and includes phosphor particles, a fluorine-containing coating covers a surface of the phosphor layer by partially covering a surface of the phosphor particles located at the surface of the phosphor layer, and a fluorine content in the coating decreases in a direction from an exposed surface of the coating toward an inside of the coating, and
a front plate having a substrate and electrodes on the substrate and positioned to form discharge spaces filled with a discharge gas between the front and the rear plates.

In one embodiment of the process of the present invention described above, the step for forming the coating is conducted by forming beforehand a fluorine-containing precoating (also referred to as merely a "precoating") which covers at least a part of the surface of each phosphor particle (more specifically which covers the surface of each of the phosphor particles or the surface of the phosphor layer), and then by supplying fluorine into this precoating. A coating obtained by supplying fluorine into the precoating has a higher UV transmittance than that of the precoating.

The precoating may be formed by depositing a fluoride according to physical vapor deposition (PVD), such as a vacuum deposition method and a sputtering method, onto at least a part of the surface of each phosphor particle (more specifically onto the surface of each of the phosphor particles or onto the surface of the phosphor layer). The fluoride is selected from the group consisting of magnesium fluoride, calcium fluoride, barium fluoride and lithium fluoride. A fluorine content in the precoating is smaller than that in a fluoride used for a deposition source or a sputtering source. However, loss of fluorine during the physical vapor deposition can be compensated by supplying fluorine into the precoating. It is preferable that a fluorine content at or near a surface of the coating can be at a level of a fluorine content in a fluoride having a stoichiometric composition. This obtained coating is made of a fluoride selected from the group consisting of magnesium fluoride, calcium fluoride, barium fluoride and lithium fluoride and shows an improved UV transmittance and a higher luminance compared with a conventional film formed by only physical vapor deposition, which film may correspond to the precoating of the present invention.

According to another aspect of the present invention, there is provided a thin film made of a fluoride selected from the group consisting of magnesium fluoride, calcium fluoride, barium fluoride and lithium fluoride, wherein a fluorine content in the thin film decreases in a direction from one surface of the film toward another surface of the film which is opposite the one surface. Similar to the above, it is preferable that the fluorine content at or near the one surface of the thin film is at a level of fluorine content in a fluoride having a stoichiometric composition. This thin film is suitably used for covering a phosphor not only in a PDP but also in other light-emitting devices. When the thin film of the present invention is formed on a phosphor by using the phosphor as a base material, the coating can pass an amount of ultraviolet rays sufficiently while it can protect the phosphor from moisture, oxygen, plasma and the like, and diffusion of fluorine atoms is suppressed since a film surface having the smaller fluorine content contacts the phosphor. Therefore, it is possible to obtain a higher luminance, a smaller degradation of luminance and a smaller shift in a wavelength of light emitted from the phosphor.

In another embodiment of the process of the present invention described above, the step for forming the coating is conducted by supplying fluorine into at least a part of a surface portion of a phosphor particle (more specifically into a surface portion of phosphor particles or into a surface portion of the phosphor particles located at a surface of a phosphor layer). As a result of supplying fluorine directly into the phosphor particle as above, a coating made of a fluorine-containing phosphor substance can be formed. It is possible to obtain a UV transmittance which is acceptable for properties of a PDP by appropriately setting a fluorine content in this coating. While the present invention is not bound by any theory, it is considered that a supplied fluorine atom occupies a hole as a crystal defect in a phosphor substance of the phosphor particle or substitutes for an appropriate atom such as an oxygen atom in a crystal of the phosphor.

In this case, a surface portion of an untreated phosphor particle before supply of fluorine (more specifically at least a part of such surface portion) is transformed into a coating by the supply of fluorine. Thus, the phosphor particle after the supply of fluorine is different in a precise sense from an untreated phosphor particle before the supply of fluorine. However, the coating obtained by transformation of the surface portion of the untreated phosphor particle can be understood as that it covers the surface of the phosphor particle after this treatment.

In general, a blue phosphor shows a relatively low luminance from among red, green and blue phosphors. Thus, it is preferable to cover a blue phosphor particle. A fluorine-containing phosphor substance of a coating obtained by supplying fluorine directly into the blue phosphor particle contains atoms of fluorine, europium, barium, aluminum, magnesium and oxygen. However, the present invention is not limited to this, and the fluorine-containing phosphor substance may contain fluorine in addition to a material which is conventionally used as a phosphor substance.

In another aspect of the present invention, there is provided a process for producing a PDP having a phosphor layer containing phosphor particles on a substrate, which process includes forming a fluorine-containing coating which covers at least a part of a surface of a phosphor particle and is composed of a fluorine-added silicon oxide layer and a silicon oxide layer thereon, by sequentially depositing fluorine-added silicon oxide and silicon oxide onto at least a part of a surface of the phosphor particle. The fluorine-added silicon oxide layer and the silicon oxide layer can be formed by, for example, chemical vapor deposition (CVD).

According to such process of the present invention, it can be realized to provide a fluorine-containing coating which exhibits higher protection from an environment such as moisture, oxygen, plasma and the like, especially for a higher water resistance, and has a higher UV transmittance. Since the phosphor particle is at least partially covered with such coating in the PDP produced by the present invention, this obtained PDP has a higher luminance and a suppressed degradation of luminance compared with a PDP using an uncovered phosphor particle.

In this case, the coating contains fluorine in the fluorine-added silicon oxide layer and does not contain fluorine in the silicon oxide layer. As to the fluorine-added silicon oxide layer, it is possible to obtain a UV transmittance which is acceptable for properties of a PDP by appropriately setting a fluorine content therein, but this layer does not show sufficient water resistance since it contains fluorine. However, since such fluorine-added silicon oxide layer is covered with the silicon oxide layer which has a higher water resistance than the fluorine-added silicon oxide layer, water resistance of the coating is remarkably improved, and this can suppress degradation of luminance compared with a case where the phosphor particle is covered with a fluoride coating only.

More specifically, there is provided a process for producing a PDP, including:
  forming a fluorine-containing coating to cover a surface of each of phosphor particles by sequentially depositing fluorine-added silicon oxide and silicon oxide onto a surface of each of the phosphor particles,
  forming electrodes and ribs on a substrate so that each electrode is between two adjacent ribs on the substrate,
  applying the phosphor particles in the form of a paste to the substrate to form a phosphor layer, including the phosphor particles covered with the coating, between the ribs on the substrate,
  positioning the substrate with respect to another substrate having electrodes thereon to form discharge spaces between the substrates, and
  filling the discharge spaces with a discharge gas.

There is also provided a process for producing a PDP, including:
  forming electrodes and ribs on a substrate so that each electrode is between two adjacent ribs on the substrate,
  applying phosphor particles in the form of a paste to the substrate to form a phosphor layer, including the phosphor particles, between the ribs on the substrate,
  forming a fluorine-containing coating to cover a surface of the phosphor layer by sequentially depositing fluorine-added silicon oxide and silicon oxide onto the phosphor layer of the substrate,
  positioning the substrate with respect to another substrate having electrodes thereon to form discharge spaces between the substrates, and
  filling the discharge spaces with a discharge gas.

In another aspect of the present invention, there is provided a PDP having a phosphor layer containing phosphor particles on a substrate, wherein at least a part of a surface of the phosphor particles is covered with a fluorine-containing coating, and the coating includes a fluorine-added silicon oxide layer and a silicon oxide layer thereon. This PDP has advantages as described above.

More specifically, there is provided a PDP including:
  a rear plate having a substrate, electrodes, ribs, and a phosphor layer, wherein each electrode is between two adjacent ribs on the substrate, the phosphor layer is between the ribs on the substrate and includes phosphor particles, a fluorine-containing coating covers a surface of each of the phosphor particles, and the coating includes a first layer of fluorine-added silicon oxide on a surface of the phosphor particles and a second layer of silicon oxide on the first layer, and
  a front plate having a substrate and electrodes on the substrate and positioned to form discharge spaces filled with a discharge gas between the front and the rear plates.

There is also provided a PDP including:
  a rear plate having a substrate, electrodes, ribs, and a phosphor layer, wherein each electrode is between two adjacent ribs on the substrate, the phosphor layer is between the ribs on the substrate and includes phosphor particles, a fluorine-containing coating covers a surface of the phosphor layer by partially covering a surface of the phosphor particles located at a surface of the phosphor layer, and the coating includes a first layer of fluorine-added silicon oxide on the surface of the phosphor particle and a second layer of silicon oxide on the first layer, and
  a front plate having a substrate and electrodes on the substrate and positioned to form discharge spaces filled with a discharge gas between the front and the rear plates.

In summary, according to the present invention described hereinabove, it is possible to realize a fluorine-containing coating or thin film which has a higher resistance to moisture, oxygen, plasma and the like, especially for a higher water resistance, and has a higher UV transmittance, and thereby there is provided a novel PDP wherein a surface of each of the phosphor particles or a surface of the phosphor layer is covered with such coating, as well as a process for producing the PDP. According to the PDP and its producing process, the PDP exhibits a higher luminance and a smaller degradation of luminance. Further, the thin film realized by the present invention is suitably used for covering a phosphor.

BRIEF DESCRIPTION OF THE DRAWINGS

A more complete appreciation of the invention and many of attendant advantages thereof will become readily apparent with reference to the following detailed description, particularly when considered in conjunction with the accompanying drawings, in which:

FIGS. 4A and 4B show graphs of a characteristic curve of a temperature-programmed desorption of an OH group, wherein

DETAILED DESCRIPTION OF THE INVENTION

Hereinafter, some embodiments of the present invention will be described in detail with reference to the drawings. Please note that the following embodiments are described mainly about characteristic parts of the present invention, and any appropriate structure and producing process of a PDP including those described above with reference to FIG. 11 can be applied to the present invention excepting phosphor particles or a phosphor layer unless otherwise specified.

First Embodiment

This embodiment relates to a PDP and a process for producing it in which an entire surface of each phosphor particle is covered with a coating made of a fluoride such as magnesium fluoride.

Figure 1:
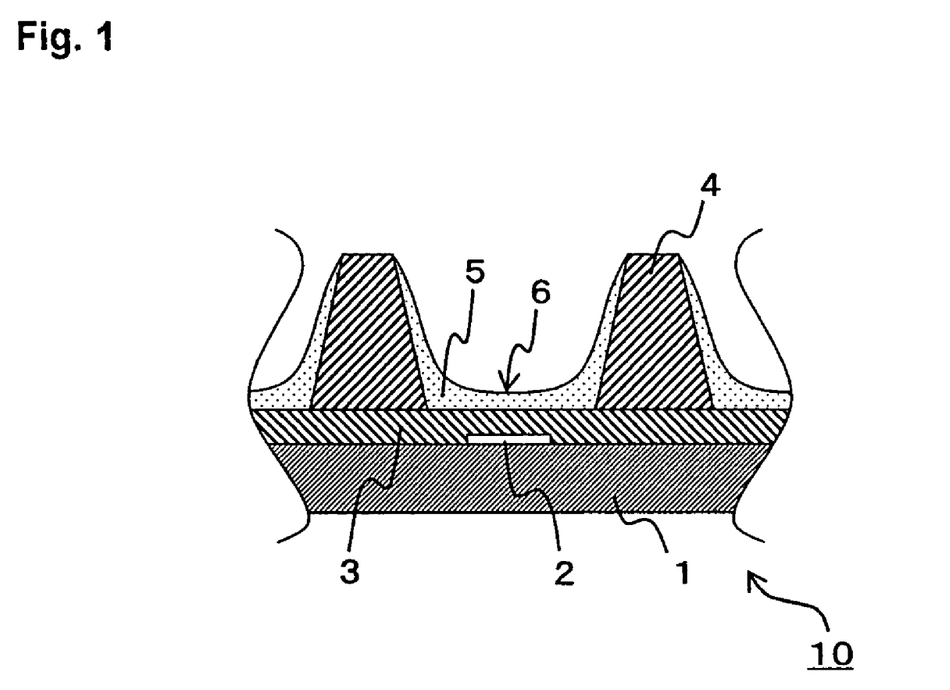
FIG. 1 schematically shows a partial cross-sectional view of a structure of a rear plate and its vicinity, which plate is used for a PDP in a first embodiment of the present invention.

A PDP of the present embodiment is constructed by positioning a rear plate 10 shown in FIG. 1 to be opposed to a front plate (not shown) and form discharge spaces therebetween while locating a phosphor layer 6 inside the spaces, and by filling the discharge spaces with a discharge gas. In the rear plate 10, address electrodes 2 (one of which is shown in FIG. 1) are located on a rear substrate 1 which is generally made of glass, and a dielectric layer 3 covers the rear substrate 1 with the address electrodes 2. A plurality of ribs 4 is located on the dielectric layer 3 and each address electrode 2 is situated between the adjacent ribs 4. A phosphor layer 5 is formed between the adjacent ribs 4 on a surface of the dielectric layer 3 covering the rear substrate 1 (as well as on side walls of the ribs 4). It is noted that the dielectric layer is not necessary for the present invention and may be omitted as in the case of the PDP shown in FIG. 11. The front plate, on the other hand, may have substantially the same structure as that of the front plate 60 in FIG. 11, and generally provided with display electrodes, a dielectric layer, and a protective layer on a front substrate which is generally made of glass.

Figure 2:
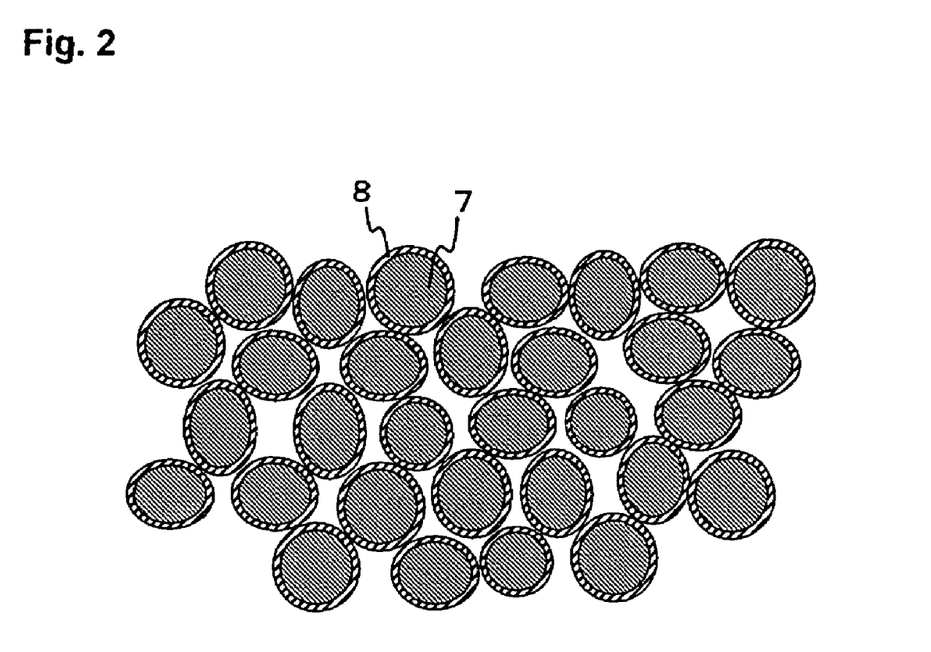
FIG. 2 schematically shows an enlarged and partial cross-sectional view of a phosphor layer in the embodiment of FIG. 1.

The phosphor layer 5 includes phosphor particles 7 each of whose surface is covered with a coating 8 entirely as shown in FIG. 2, and may further include a binder residue of a paste (not shown). The coating 8 contains fluorine in the present embodiment the coating 8 is made of a fluoride selected from the group consisting of magnesium fluoride, calcium fluoride, barium fluoride and lithium fluoride. A fluorine content in the coating 8 is decreased in a direction from a surface of the coating 8 toward an inside of covered phosphor particle 7, which will be described hereinafter.

As the phosphor particles 7, but not limited to, particles made of an appropriate phosphor material and/or having an average diameter of about 100 to 10000 nm are used. The phosphor material may be a phosphor substance as described in the above with reference to FIG. 11. For example, blue phosphor particles may consist of $3(Ba, Mg)O.8Al_2O_3$:Eu.

Figure 3:
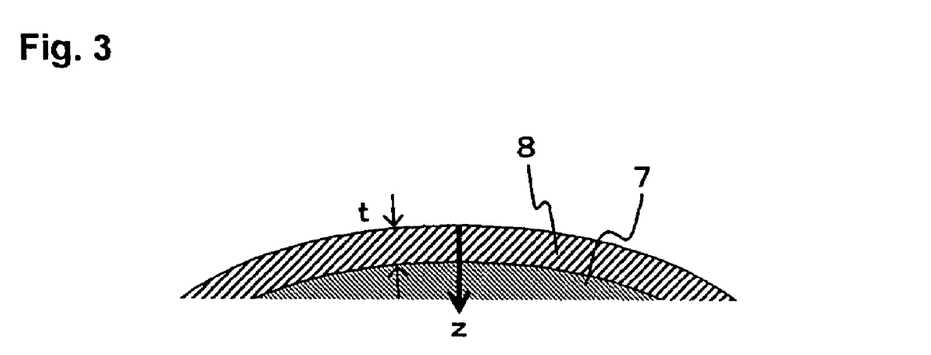
FIG. 3 schematically shows an enlarged and partial cross-sectional view of a phosphor particle with a coating in FIG. 2.

A thickness "t" of the coating 8 (see FIG. 3) is preferably about 1 to 100 nm. A coating having a thickness less than 1 nm cannot be formed with high reproducibility and cannot provide high protection with such a thin thickness. On the other hand, a coating having a thickness more than 100 nm shows a lower UV transmittance. The coating thickness is more preferably about 5 to 20 nm.

Next, a process for producing the PDP of this embodiment will be described.

At first, naked phosphor particles 7 as a raw material are prepared. While using a fluoride selected from the group consisting of magnesium fluoride, calcium fluoride, barium fluoride and lithium fluoride as an evaporation source, a precoating made of the fluoride is formed to cover an entire surface of each phosphor particle 7 according to a vacuum deposition by heating the source to evaporate. Such formation of the precoating can be conducted by a conventional deposition method known in the art under general conditions. A fluorine content in this formed precoating is less than that in the fluoride used as the source, and is about 50 to 60 atm % when the fluoride used as the source is magnesium fluoride having virtually a stoichiometric composition.

Then, thus obtained phosphor particles 7 with the precoating are heated in a gas phase containing fluorine gas ($F_2$ gas). A heating temperature, for example, is about 100 to 400° C. and a pressure is about 0.1 to 1000 Pa. A temperature less than 100° C. may cause degradation of the phosphor by oxidation due to adsorption of $H_2O$ and $CO_2$ on the phosphor during operation of the PDP. In case of a temperature higher than 400° C., the coating sometimes removes from the phosphor particle or becomes cracked due to a difference in their coefficients of thermal expansion when their ambient temperature is lowered to room temperature after heat treatment. In case of a pressure lower than 0.1 Pa, a period required for forming the coating becomes longer due to a lower rate of supplying fluorine. In case of a pressure higher than 1000 Pa, a period for flowing fluorine gas into treatment equipment becomes longer and a greater amount of fluorine gas is needed so that productivity is lowered. More concretely, supply of fluorine can be conducted by a heat treatment in fluorine gas for about 20 minutes under conditions of a temperature of about 150° C. and a pressure of about 50 Pa.

By heating in fluorine gas, fluorine is supplied to the phosphor particle 7 covered with the precoating, and thus fluorine is supplied (or introduced) into the precoating. Supply of fluorine in this embodiment can be understood as that it compensates for loss of fluorine due to physical vapor deposition. This compensation of fluorine is brought about especially at or in the vicinity of the surface of the coating 8.

It is preferable to conduct a step for forming the precoating and a step for supplying fluorine while, for example, mixing the phosphor particles 7 in order to uniformly form the precoating and supply fluorine with respect to a surface of each of the phosphor particles 7.

As described above, the coating 8 is formed to cover the entire surface of each of the phosphor particles 7.

Next, the phosphor particles 7 each covered with the coating 8 are mixed with an appropriate binder or the like into a paste. Then, the paste is applied to a region(s) between adjacent ribs 4 on the substrate 1 which is provided with the address electrodes 2, the dielectric layer 3 and the ribs 4 beforehand.

In a case of producing a color PDP, procedures described above are repeated for each color. For example, a red phosphor layer, a green phosphor layer, and a blue phosphor layer are formed in a striped pattern between ribs as described with reference to FIG. 11.

Thus obtained rear plate 10 is subjected to firing to make an applied paste into phosphor layer 5. Then, this rear plate 10 and a front plate (not shown), which is manufactured separately, are appropriately positioned to be opposed and aligned with each other to form discharge spaces between the plates (more specifically between the substrates of these plates). The plates are sealingly adhered to each other with an adhesive by heating the adhesive. A discharge gas is inserted into and fills the discharge spaces. Thus, a PDP (not shown in its entirety) of the present embodiment is produced.

According to the PDP produced by the above, the phosphor particles can be effectively protected from oxygen, plasma and the like by the fluorine-containing coating which covers the surface of each phosphor particle when compared with a PDP using an uncoated or naked phosphor particle, and thereby an obtained PDP has a higher luminance and a smaller degradation of luminance.

Also according to this embodiment, the phosphor particle is covered with the fluorine-containing coating having a higher water resistance than uncoated phosphor particles. Thus, the phosphor particles can be effectively protected from moisture, and thereby an obtained PDP has a higher luminance.

Figure 4A:
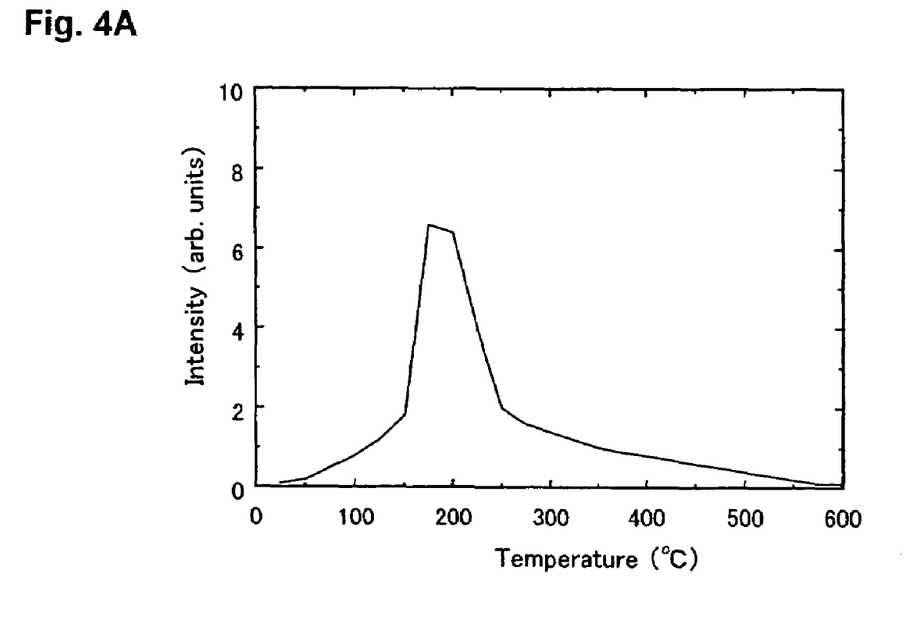
FIG. 4A shows a graph for phosphor particles without a coating and FIG. 4B shows a graph for phosphor particles with a coating.
Figure 4B:
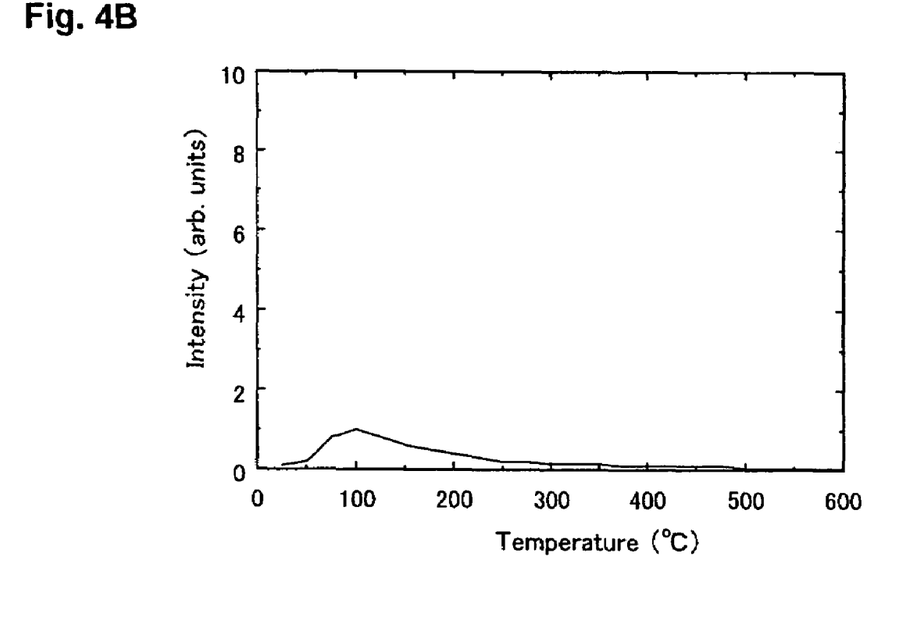

For confirming an effect of improvement in terms of water resistance by the fluorine-containing coating, the inventors focused on an OH group which causes a deformation of phosphor (degradation by oxidization) and measured a characteristic curve of a temperature-programmed desorption of an OH group with respect to phosphor particles after they are subjected to a general adhering (or sealing) process. Results are shown in FIGS. 4A and 4B. FIG. 4A shows a characteristic curve of a temperature-programmed desorption of an OH group with respect to uncoated phosphor particles, and FIG. 4B shows a characteristic curve of a temperature-programmed desorption of an OH group with respect to phosphor particles covered with a coating of magnesium fluoride according to the present embodiment. A temperature was raised in a range of FIGS. 4A and 4B. As understood from these figures, while a large amount of an OH group was emitted from the phosphor particles with no coating (FIG. 4A), a small amount of an OH group was emitted from the phosphor particles covered with the coating (FIG. 4B). This proves that more moisture was adsorbed to the phosphor particles in the former case, but in the latter case an amount of adsorbed moisture was very small so that the phosphor particles were protected from moisture by the coating.

According to the present embodiment, the phosphor particle is covered with the coating wherein an amount of fluorine which is lost during physical vapor deposition is compensated, and the coating is transparent and has a very high UV transmittance. Thus, a greater amount of an ultraviolet ray can be supplied into the phosphor particles during operation of the PDP, and thereby an obtained PDP has a higher luminance.

Figure 5:
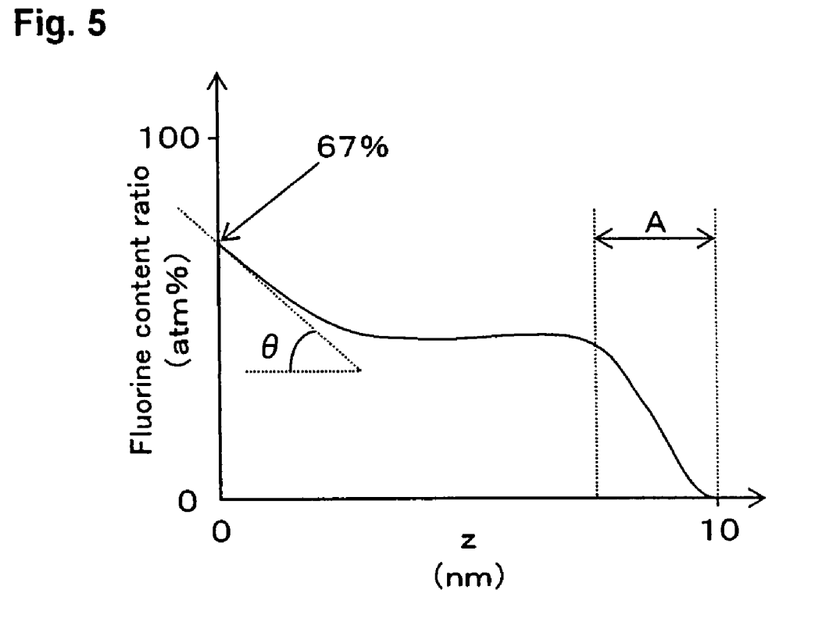
FIG. 5 shows a graph of a fluorine content of a phosphor particle with a coating in FIG. 3.

When focusing on one phosphor particle, a fluorine content in the coating 8 is shown in FIG. 5 while setting a "z" axis setting as an origin at the surface of the coating 8 and being in a direction of an inside of the covered phosphor particle 7. (See FIG. 3, wherein "z" means a depth from the surface of the coating.) It is noted that FIG. 5 shows an exemplary case where the coating has a thickness of about 10 nm. Such in-depth profiling of the fluorine content within the coating and the phosphor particle can be measured by XPS analysis (X-ray Photoelectron Spectrometer analysis) under an acceleration voltage of about 1 to 3 kV. In a case of a voltage more than 3 kV, detection sensitivity is low. In a case of a voltage less than 1 kV, a sputtering rate is not sufficient. The in-depth profiling as above can also be measured by SIMS (Secondary Ion Mass Spectrometry), AES analysis (Auger Electron Spectroscopy analysis) or TEM analysis (Transmission Electron Microscope analysis).

According to the present embodiment, the coating 8 is made of a fluoride selected from the group consisting of magnesium fluoride, calcium fluoride, barium fluoride and lithium fluoride. In such embodiment, the fluorine content at the surface of the coating (i.e. the fluorine content at z=0) is, for example, about 50 to 80 atm %. In case of a fluorine content less than 50 atm %, a transparency and a UV transmittance of the coating are insufficient. In case of a fluorine content more than 80 atm %, more fluorine is emitted to a discharge space from the coating during operation of the PDP so that a voltage at which discharge is started is increased. The fluorine content is most preferably a fluorine content in a stoichiometric composition of the fluoride, i.e. about 67%. In general, compounds of magnesium fluoride, calcium fluoride, barium fluoride and lithium fluoride are transparent and have a high UV transmittance, and the inventors have confirmed that these show a sufficient transparency and a sufficient UV transmittance when they are applied to the coating in the present embodiment.

According to the present embodiment, the fluorine content in the coating is higher at the surface of the coating and decreases away from the surface in a direction to the inside of the phosphor particle (see FIG. 5). Thus, diffusion of fluorine atoms which would cause transformation of the phosphor particle is suppressed, and thus the PDP has a higher luminance and a lower degradation in terms of luminance, and a smaller shift in a wavelength of light emitted from the phosphor.

More specifically, the fluorine content steeply drops in the vicinity of an interface between the coating and the phosphor particle 7 in a direction from the coating to the inside of the phosphor particle 7 (see a region designated as "A" in FIG. 5). In this region, constituent atoms of the phosphor particle 7 (in the case of a blue phosphor substance, atoms of magnesium, barium, aluminum and oxygen) are diffused into the coating 8 to form a mixture of the constituent atoms of the phosphor 7 and that of the coating 8 (in that case, a mixture of atoms of magnesium, barium, aluminum, oxygen and fluorine).

When the graph shown in FIG. 5 is scaled in a size wherein points in the axes of "z=8 nm" and "fluorine content=100 atm %" are the same distance from the origin, a gradient "θ" (see FIG. 5) of the fluorine content at the surface of the coating (z=0) is preferably set at about 20° to 50° by appropriately designing a composition of the coating and conditions for producing it. If the gradient is less than 20°, compensation of fluorine at or in the vicinity of the surface of the coating 8 is insufficient, so that desired UV transmittance is not achieved. If the gradient is more than 50°, the fluorine content at a surface portion of the phosphor particle exceeds a fluorine content in the stoichiometric compound, so that more fluorine is emitted and exists in the discharge space during operation of the PDP, and thereby discharge stability may be impaired. It is noted that the "θ" is an angle between the "z" axis and a tangential line of the fluorine content curve at "z=0".

Hereinabove a first embodiment of the present invention is described, but various modifications can be made within the scope of the present invention.

Although vacuum deposition is used for forming the precoating in the present embodiment, another physical vapor deposition method, for example a sputtering method can be used. A fluorine content in a precoating formed by the sputtering method is less than that formed by the vacuum deposition method, and is about 30 to 55 atm % when a compound of magnesium fluorine having an almost stoichiometric composition is used as a sputtering source. A larger amount of fluorine is lost by the sputtering method than by the vapor deposition method, so that properties of the PDP are remarkably improved by compensation of fluorine in a case using sputtering.

While the present embodiment uses heating in a gas phase containing fluorine for supplying fluorine to the precoating, the phosphor particles 7 provided with the precoating can be irradiated with a plasma including a fluorine radical instead. For example, a plasma which is generated by using a fluorine-containing gas such as $C_xF_y$ (wherein x and y are natural numbers) or $SF_6$ can be used.

Irradiation of a plasma including a fluorine radical can be conducted under a pressure of about 10 to 1000 Pa by using a general vacuum plasma processing apparatus. In case of a pressure less than 10 Pa, the coating sometimes becomes damaged by ion bombardment. In case of a pressure more than 1000 Pa, a plasma is hardly generated with a general vacuum plasma processing apparatus. When using such an apparatus, a flow rate of the fluorine-containing gas is preferably about 50 to 1000 sccm. (The unit "sccm" means herein a flow rate (cc) per minute at a standard condition of a temperature of 0° C. and a pressure of 1 atm.) In case of a flow rate less than 50 sccm, a throughput speed and thus productivity is lowered. In case of a flow rate more than 1000 sccm, an increased use of the gas is not worth a degree of improvement in the throughput speed so that it is not cost-effective. A high-frequency power is preferably about 0.2 to 10 $W/cm^2$. In case of a high-frequency power less than 0.2 $W/cm^2$, the throughput speed is very low. In case of a high-frequency power more than 10 $W/cm^2$, the coating sometimes removes from the phosphor particle or becomes cracked when its ambient temperature is lowered to a room temperature after treatment. More concretely, when a gas of $SF_6$, for example, is used as the fluorine-containing gas, supply of fluorine can be conducted by a treatment for about one minute in a parallel plate type plasma processing apparatus under conditions of: a $SF_6$ gas flow rate of about 200 sccm; a pressure of about 50 Pa; a high-frequency power of about 1.0 $W/cm^2$; and a frequency of the high-frequency power of about 13.56 MHz.

Alternatively, irradiation of plasma including a fluorine radical can be conducted under a pressure of about 50000 to 150000 Pa by using a general atmospheric pressure plasma processing apparatus. In this case, a desired coating can be formed with a lower cost compared with a case using a vacuum plasma processing apparatus. When using the atmospheric pressure plasma processing apparatus, a flow rate of the fluorine-containing gas is preferably about 200 to 10000 sccm. In case of a flow rate less than 200 sccm, a throughput speed and thus a productivity is lowered. In case of a flow rate more than 10000 sccm, an increased use of the gas is not worth a degree of improvement in the throughput speed so that it is not cost-effective. With respect to other conditions, substantially same conditions as those for the vacuum plasma processing apparatus described above are applied.

In the present embodiment, a formed coating is made of a fluoride selected from the group consisting of magnesium fluoride, calcium fluoride, barium fluoride and lithium fluoride. Additionally, a layer of an oxide selected from the group consisting of magnesium oxide, calcium oxide, barium oxide and lithium oxide can be formed on such coating to further improve water resistance.

Second Embodiment

This embodiment relates to a PDP and a process for producing it in which an entire surface of each phosphor particle is covered with a coating made of a fluoride-containing phosphor substance.

A PDP of the present embodiment may have a similar structure to that of the PDP of the first embodiment described above with reference to FIGS. 1 to 3, except for a material of a coating. A coating in the present embodiment is made of a fluoride-containing phosphor substance. In a case for a blue phosphor particle, for example, the coating includes atoms of fluorine, europium, barium, aluminum, magnesium and oxygen. In a case for a red phosphor particle, the coating includes atoms of fluorine, europium, yttrium and oxygen. In a case for a green phosphor particle, the coating includes atoms of fluorine, manganese, barium, aluminum and oxygen.

A thickness of the coating is preferably about 1 to 5 nm. A coating having a thickness less than 1 nm cannot be formed with high reproducibility and cannot provide high protection with such a thin thickness. On the other hand, a coating having a thickness more than 5 nm shows a lower UV transmittance. A definition of the thickness with respect to this embodiment will be described below.

Such PDP of the present embodiment can be produced by modifying the process described in the first embodiment while omitting formation of the precoating and supplying fluorine directly into each phosphor particle. That is, supply of fluorine is conducted into a surface portion in its entirety (or a peripheral portion or an outer shell portion) of untreated or naked phosphor particles to transform the surface portion into the coating. As a result, the coating is formed to cover an entire surface of each phosphor particle. The supply of fluorine can be conducted under similar conditions to those for the first embodiment.

Figure 6:
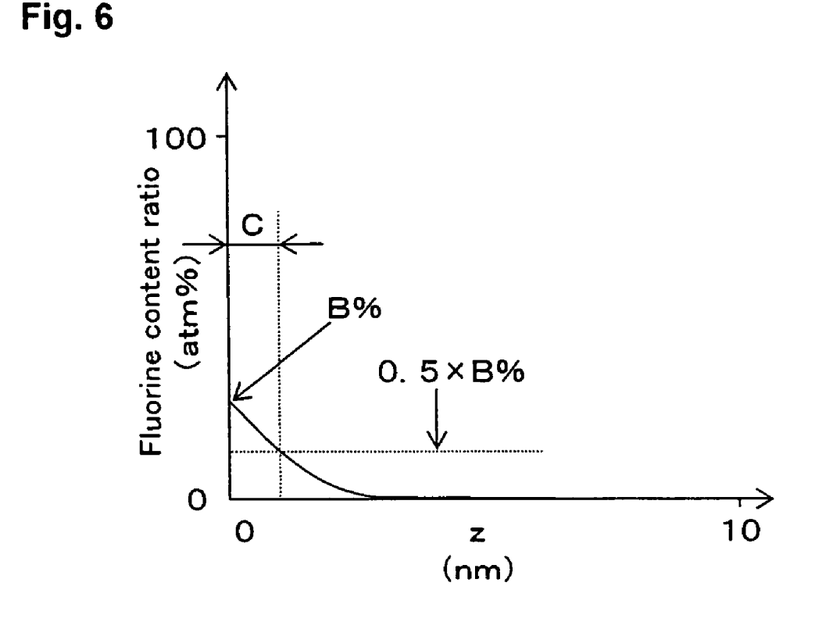
FIG. 6 shows a graph of a fluorine content of a phosphor particle with a coating in a second embodiment of the present invention.

With respect to a thus produced PDP of the present embodiment, a fluorine content in the coating is shown in FIG. 6. In the present embodiment, the fluorine content at a surface of the coating (i.e. the fluorine content at z=0 in FIG. 6) is preferably, for example, about 10 to 30 atm %. In case of a fluorine content less than 10 atm %, protection from moisture is not sufficiently enhanced compared with a phosphor particle with no coating. In case of a fluorine content more than 30 atm %, decrease in emission efficiency is remarkable.

In this embodiment, since a portion of an untreated phosphor particle from a surface thereof to a position at which fluorine is supplied is transformed into the coating, it is difficult to determine an interface between the coating and a treated and covered phosphor particle. However, the thickness of the coating is defined as a value of "z" at which a fluorine content is a half of the fluorine content B (atm %) at the surface of the coating (z=0); that is, at which a fluorine content is 0.5×B (atm %). (A portion shown with "C" in FIG. 6 is considered as the coating.)

According to the present embodiment, the phosphor particles can also be effectively protected from oxygen, plasma and the like by the fluorine-containing coating which covers the surface of each phosphor particle when compared with a PDP using an uncoated or naked phosphor particle, and thereby an obtained PDP has a higher luminance and a lower degradation of luminance. In addition, the coating has a high UV transmittance and a high water resistance which are acceptable for properties of a PDP, and diffusion of fluorine atoms which would cause transformation of the phosphor particle is suppressed, and thereby the obtained PDP has a higher luminance, a lower degradation of luminance and a smaller shift in a wavelength of light emitted from the phosphor.

Hereinabove the second embodiment of the present invention is described, but please note that various modifications can be made similarly to the first embodiment.

Third Embodiment

This embodiment relates to a PDP and a process for producing it in which an entire surface of each phosphor particle is covered with a coating made of a fluorine-added silicon oxide layer and a silicon oxide layer.

Figure 7:
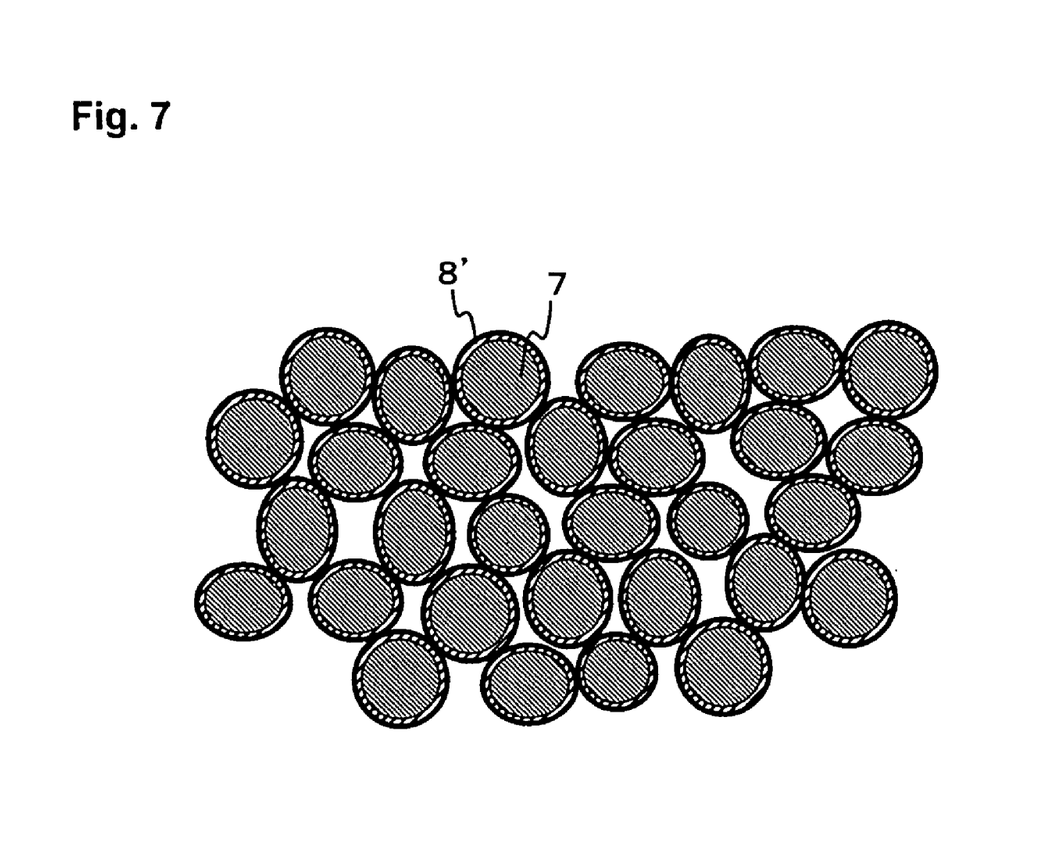
FIG. 7 schematically shows an enlarged and partial cross-sectional view of a phosphor layer in a third embodiment of the present invention.
Figure 8:
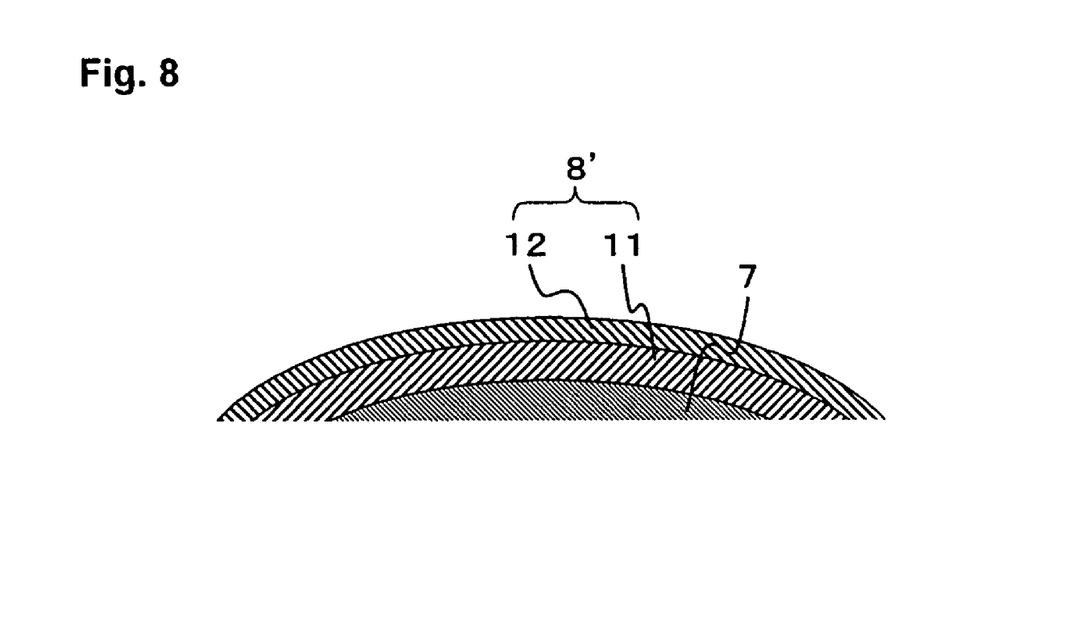
FIG. 8 schematically shows an enlarged and partial cross-sectional view of a phosphorus particle in FIG. 7.

A PDP of the present embodiment may have a similar structure to that of the PDP of the first embodiment described above with reference to FIG. 1, except for a material and a structure of a coating. As shown in FIGS. 7 and 8, a coating in the present embodiment is made of a fluorine-added silicon oxide (SiOF) layer 11 and a silicon oxide (SiO$_2$) layer 12 thereon.

A thickness of the fluorine-added silicon oxide layer 11 of coating 8' is preferably about 1 to 20 nm and more preferably about 1 to 15 nm. A thickness of the silicon oxide layer 12 of the coating 8' is preferably about 1 to 10 nm and more preferably about 1 to 5 nm. With respect to both layers, a layer having a thickness less than 1 nm cannot be formed with high reproducibility and cannot provide high protection with such a thin thickness. If a layer is thicker than 20 nm for the fluorine-added silicon oxide layer and thicker than 10 nm for the silicon oxide layer, UV transmittance is lowered. Especially, the silicon oxide layer has a lower UV transmittance than that of the fluorine-added silicon oxide layer. Thus, it is preferable to make the silicon oxide layer thinner than the fluorine-added silicon oxide layer.

Such PDP of the present embodiment can be produced by the process described in the first embodiment, except that the coating 8' consisting of the fluorine-added silicon oxide layer 11 and the silicon oxide layer 12 is formed by sequentially depositing fluorine-added silicon oxide (SiOF) and silicon oxide (SiO$_2$) by chemical vapor deposition (CVD) to cover the surface of each of the phosphor particles 7.

Formation of the fluorine-added silicon oxide layer 11 by a plasma CVD can be conducted by using a source gas including tetra-ethoxy-silane and oxygen, and also including a fluorine-containing gas including at least one of perfluorocarbon, hydrofluorocarbon and sulfur fluoride. It is advantageous to use tetra-ethoxy-silane (which is also called tetra-ethyl-ortho-silicate and hereinafter also referred to as "TEOS") since it is safe and easy to care for.

Deposition of fluorine-added silicon oxide by a plasma CVD can be conducted under a pressure of about 50 to 1000 Pa by using a general vacuum plasma processing apparatus. In case of a pressure less than 50 Pa, a deposited layer sometimes is damaged by ion bombardment. In case of a pressure more than 1000 Pa, a plasma is hardly generated with the general vacuum plasma processing apparatus. When using such an apparatus, a flow rate of a TEOS gas is preferably about 50 to 300 sccm. In case of a flow rate less than 50 sccm, a throughput speed and thus a productivity is lowered. In case of a flow rate more than 300 sccm, elaborateness of a deposited layer is lowered. A flow rate of an oxygen gas is preferably about 1.5 to 5 times as large as that of the TEOS gas. In a case where a flow rate ratio of the oxygen gas to the TEOS gas is less than 1.5, a deposited layer contains more silicon so that chemical stability of the layer is lowered. In a case where this ratio is more than 5, a throughput speed is lowered. A flow rate of the fluorine-containing gas including any of perfluorocarbon, hydrofluorocarbon and sulfur fluoride is preferably about 0.1 to 2 times as large as that of the TEOS gas. In a case where a flow rate ratio of the fluorine-containing gas to the TEOS gas is less than 0.1, a fluorine content in the coating tends to be less than 10 atm % resulting in insufficient UV transmittance. In a case where this ratio is more than 2, a fluorine content in the coating tends to be more than 50 atm % resulting in an insufficient strength of the layer and also a lowered throughput speed since an etching reaction occurs during formation of the layer. A high-frequency power is preferably about 0.2 to 10 W/cm$^2$. In case of a high-frequency power less than 0.2 W/cm$^2$, a throughput speed is very low. In case of a high-frequency power more than 10 W/cm$^2$, a deposited layer sometimes removes from the phosphor particle or becomes cracked when its ambient temperature is lowered to room temperature after treatment. More concretely, the fluorine-added silicon oxide layer can be formed by a treatment for about 5 seconds in a parallel plate type plasma processing apparatus under conditions of: a flow rate ratio of "TEOS gas; oxygen gas; C$_2$F$_6$ gas" is 100:200:50 (sccm); a pressure is about 150 Pa; a high-frequency power is about 1.0 W/cm$^2$; and a frequency of the high-frequency power is about 13.56 MHz.

Formation of the silicon oxide layer 12 by plasma CVD can be conducted by using a source gas including tetra-ethoxy-silane and oxygen. Deposition of silicon oxide by plasma CVD can be conducted under similar conditions to those for the deposition of fluorine-added silicon oxide described above by using a general vacuum plasma processing apparatus, except that the fluorine-containing gas including any of perfluorocarbon, hydrofluorocarbon and sulfur fluoride is omitted (that is, the flow rate thereof is set at zero).

Alternatively, the formation of the fluorine-added silicon oxide layer 11 and/or the silicon oxide layer 12 by plasma CVD can be conducted under a pressure of about 50000 to 150000 Pa by using a general atmospheric pressure plasma processing apparatus. In this case, desired deposited layer(s) (i.e. the fluorine-added silicon oxide layer 11 and/or the silicon oxide layer 12) can be formed with a lower cost compared with a case using the vacuum plasma processing apparatus. When using the atmospheric pressure plasma processing apparatus, a flow rate of the TEOS gas is preferably about 100 to 1000 sccm. In case of a flow rate less than 100 sccm, a throughput speed and thus a productivity is lowered. In case of a flow rate more than 1000 sccm, elaborateness of a deposited layer is lowered. With respect to other conditions, substantially same conditions as those for the vacuum plasma processing apparatus described above are applied.

As described above, the coating 8' is formed to cover an entire surface of each of the phosphor particles 7. It is preferable to conduct steps for forming the fluorine-added silicon oxide layer and for forming the silicon oxide layer while, for example, mixing the phosphor particles 7 in order to uniformly form the coating with respect to the surface of each of the phosphor particles 7.

With respect to thus produced PDP of the present embodiment, the coating 8' contains fluorine in the fluorin-added silicon oxide layer 11 and dose not contain fluorine in the silicon oxide layer 12. (It is noted that fluorine atoms may diffuse from the fluorine-added silicon oxide layer 11 into the silicon oxide layer 12.) A fluorine content in the fluorine-added silicon oxide layer 11 is almost uniform in a cross-section of the layer and is, for example, about 10 to 50 atm % in this embodiment. A fluorine content less than 10 atm % results in an insufficient UV transmittance, and a fluorine content more than 50 atm % results in an insufficient strength of the layer.

The fluorine-added silicon oxide layer has a better UV transmittance but has a lower water resistance compared with those of the silicon oxide layer. If the coating consists of a single layer of silicon oxide, a relatively large thickness is required for the layer to assure a protection from plasma and the like as well as moisture, and therefore a sufficient UV transmittance is not obtained with such thicker layer of silicon oxide. In contrast, by laminating two layers of fluorine-added silicon oxide and silicon oxide, the phosphor particle 7 can be protected from oxygen, plasma and the like by the fluorine-added silicon oxide layer 11 having a high UV transmittance, and can be highly protected from moisture by the silicon oxide layer 12 having a very high water resistance.

According to the present embodiment, the phosphor particles can also be effectively protected from oxygen, plasma and the like by the fluorine-containing coating which covers the surface of each phosphor particle when compared with a PDP using an uncoated or naked phosphor particle, and thereby this obtained PDP has a higher luminance and a lower degradation in terms of luminance. In addition, the coating has a very high water resistance and a high UV transmittance which is acceptable for properties of a PDP, and thereby the obtained PDP has a higher luminance and a lower degradation of luminance.

While the coating of the present embodiment consists of the two layers of the fluorine-added silicon oxide layer and the silicon oxide layer, the silicon oxide layer may be omitted and only the fluorine-added silicon oxide layer may be deposited on the surface of the phosphor particle by plasma CVD. The fluorine-added silicon oxide layer has a lower UV transmittance but has an advantage of good water resistance compared with those of a magnesium fluoride layer having a stoichiometric composition.

Fourth Embodiment

This embodiment relates to a PDP and a process for producing it in which a surface of a phosphor layer, more specifically an exposed part of a surface of each of phosphor particles which are located at a surface of the phosphor layer, is covered with a coating made of a fluoride such as magnesium fluoride.

Figure 9:
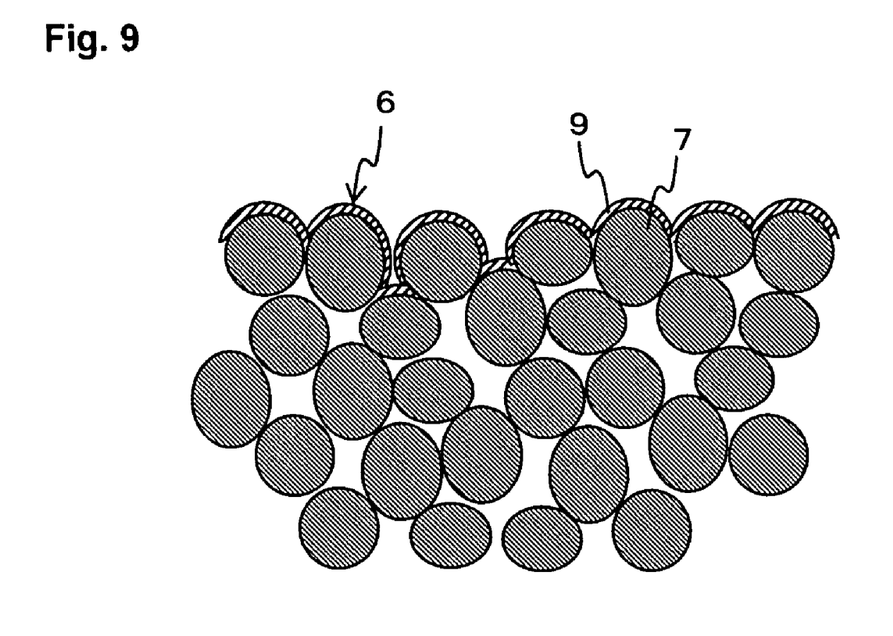
FIG. 9 schematically shows an enlarged and partial cross-sectional view of a phosphor layer in a fourth embodiment of the present invention.

A PDP of the present embodiment may have a similar structure to that of the PDP of the first embodiment described above with reference to FIG. 1, except for a material and a structure of a phosphor layer. Surface 6 of the phosphor layer and vicinity thereof in the first embodiment of FIG. 1 are changed in this embodiment as shown in FIG. 9. That is, a surface 6 of a phosphor layer 5, more specifically a partial surface of each of phosphor particles 7 which are at the surface of the phosphor layer 5, is covered with a coating 9. The coating 9 may be made of a similar material and have a similar thickness to those of coating 8 in the first embodiment.

Next, a process for producing the PDP of this embodiment will be described.

At first, untreated (thus uncovered and naked) phosphor particles 7 are mixed with an appropriate binder or the like into a paste. Then, the paste is applied to a region(s) between adjacent ribs 4 on substrate 1 which is provided with address electrodes 2, dielectric layer 3 and the ribs 4 beforehand.

In a case of producing a color PDP, procedures described above are repeated as to each color.

Thus obtained rear plate 10 is subjected to firing to make this applied paste into the phosphor layer 5.

Next, a precoating is formed to cover a surface of the phosphor layer 5 by vacuum deposition similarly to that in the first embodiment described above, except that the phosphor particles 7 are in the form of the phosphor layer 5. Then, the phosphor layer 5 is heated in a gas phase containing fluorine gas to supply fluorine to the phosphor layer 5. As a result, fluorine is supplied into the precoating.

It is preferable to conduct the step for forming the precoating and the step for supplying fluorine while, for example, rotating and/or moving the rear plate 10 in order to uniformly form the precoating and supply fluorine with respect to the surface of the phosphor layer 5. This is more preferable for performing physical vapor deposition, which generally shows a poor step coverage, to form the precoating since the surface of the phosphor layer 5 has concavities and convexities due to aggregation of the phosphor particles.

As described above, the coating 9 is formed to cover the surface of the phosphor layer 5 (or a partial surface of each of the phosphor particles 7 which are at the surface of the phosphor layer 5). Properties of this obtained coating 9 are similar to those of the coating 8 in the first embodiment.

Then, this rear plate 10 and a front plate (not shown) which is manufactured separately are appropriately positioned to be opposed and aligned with each other and to form discharge spaces between the plates. The plates are sealingly adhered to each other with an adhesive by heating the adhesive. A discharge gas is inserted into and fills the discharge spaces. Thus, the PDP (not shown) of the present embodiment is produced.

According to the PDP produced in the present embodiment, the phosphor particles can also be effectively protected from oxygen, plasma and the like by the fluorine-containing coating which covers the surface of the phosphor layer (more specifically a partial surface of each of the phosphor particles which are at the surface of the phosphor layer) when compared with a PDP using an uncoated or naked phosphor particle (or an uncoated phosphor layer), and thereby the obtained PDP has a higher luminance and a lower degradation of luminance. In addition, the coating has a sufficiently high UV transmittance and a high water resistance, and diffusion of fluorine atoms which would cause transformation of the phosphor particle is suppressed, and thereby the obtained PDP has a higher luminance, a lower degradation of luminance and a smaller shift in a wavelength of light emitted from the phosphor.

Hereinabove the fourth embodiment of the present invention is described, but various modifications can be made within the scope of the present invention.

The present embodiment can be modified similarly to the first embodiment. More concretely, in place of vacuum deposition, other physical vapor deposition such as a sputtering method can be used for forming the precoating. Further, instead of heating in a gas phase containing fluorine, the phosphor layer 5 (more specifically the phosphor particles 7) which is provided with the precoating can be irradiated with a plasma including fluorine radicals for supplying fluorine to the precoating. Additionally, a layer of an oxide selected from the group consisting of magnesium oxide, calcium oxide, barium oxide and lithium oxide can be formed on the coating made of a fluoride selected from the group consisting of magnesium fluoride, calcium fluoride, barium fluoride and lithium fluoride to further improve water resistance.

While the coating 9 is formed by similar procedures to those for forming the coating 8 in the first embodiment described above, similar procedures to those in the second embodiment can be used instead. In such case, fluorine is supplied into a phosphor layer, more specifically an exposed part of a surface portion of each of phosphor particles which are located at a surface of a phosphor layer. According to this modification, similar effects to those obtained by the second embodiment can also be obtained.

Figure 10:
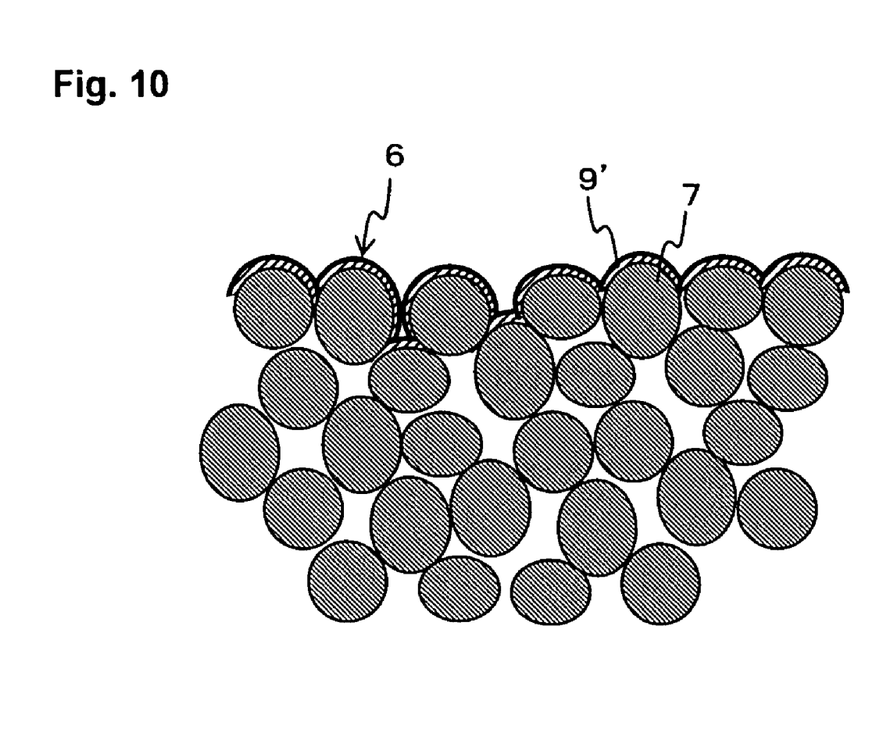
FIG. 10 schematically shows an enlarged and partial cross-sectional view of a phosphor layer in a modification of the embodiment of FIG. 9.

Furthermore, the coating 9 can be changed into a coating 9' having two layers, a fluorine-added silicon oxide layer and a silicon oxide layer (see FIG. 10). The coating 9' may be formed by similar procedures to those for forming the coating 8' in the third embodiment described above. In such case, these layers are deposited and formed on a phosphor layer, more specifically an exposed part of a surface of each of phosphor particles which are located at a surface of a phosphor layer. According to this modification, similar effects to those obtained by the third embodiment can also be obtained. Since these layers can be formed as described in the third embodiment by plasma CVD, which shows a good step coverage, this embodiment is preferable in view of step coverage for forming the coating on the surface of the phosphor layer 5 having concavities and convexities. It is noted that the silicon oxide layer may be omitted and only the fluorine-added silicon oxide layer may be formed on the surface of the phosphor layer by plasma CVD.

Fifth Embodiment

This embodiment relates to a thin film which is suitable for covering a phosphor, and a process for producing it.

A thin film of the present embodiment is made of a fluoride selected from the group consisting of magnesium fluoride, calcium fluoride, barium fluoride and lithium fluoride, and a fluorine content in the thin film decreases in a direction from one surface of the film toward another surface of the film which is opposite the one surface. Such film can be produced on an appropriate base material according to similar procedures to those for forming the coating 8 in the first embodiment described above.

The thin film of the present embodiment can provide effective protection from oxygen, plasma and the like, and furthermore it is transparent and has a high UV transmittance and a high water resistance. When a phosphor in any appropriate form is used as a base material and such thin film is formed thereon, since the film surface having a lower fluorine content contacts the phosphor, a higher luminance can be obtained, and degradation of luminance and shift in a wavelength of light emitted from the phosphor can be suppressed as understood from descriptions for the first embodiment. The thin film of the present embodiment is suitably used for covering or coating a phosphor not only in a PDP, but also in, for example, a fluorescent lamp, a xenon lamp and an FED (Field Emission Display).

In addition, the thin film of the present embodiment is applicable for various uses where a protective film having a high transparency, a high UV transmittance and a high water resistance is required. For example, the thin film of the present embodiment is suitably used as an anti-reflection film by forming the thin film on an optical lens as a base material.

Similar to the relationship between the coating used in the first embodiment and the thin film of the present embodiment, the coatings described in the second and the third embodiments can also be applied as a thin film which is suitable for covering a phosphor.

What is claimed is:

1. A process for producing a plasma display panel, comprising:
providing a first plurality of electrodes and a plurality of ribs on a first substrate such that one electrode of said first plurality of electrodes is disposed between each pair of immediately adjacent ribs in said plurality of ribs;
forming a fluorine-containing coating on a surface of each phosphor particle of a plurality of phosphor particles by irradiating said phosphor particles with a plasma including a fluorine radical such that fluorine is supplied to said phosphor particles; then
applying said phosphor particles in the form of a paste onto said first substrate to form a phosphor layer between each pair of immediately adjacent ribs in said plurality of ribs;
positioning said first substrate relative to a second substrate having a second plurality of electrodes thereon such that discharge spaces are defined between said first and second substrates; and
filling said discharge spaces with a discharge gas.

2. The process according to claim 1, wherein
forming said fluorine-containing coating comprises irradiating said phosphor particles with said plasma such that said fluorine is supplied into a fluorine-containing pre-coating which is previously formed to cover said surface of said each phosphor particle of said plurality of phosphor particles.

3. The process according to claim 2, wherein
said fluorine-containing pre-coating is formed by depositing onto said surface of said each phosphor particle of said plurality of phosphor particles, by physical vapor deposition, a fluoride selected from the group consisting of magnesium fluoride, calcium fluoride, barium fluoride and lithium fluoride.

4. The process according to claim 1, wherein
forming said fluorine-containing coating comprises irradiating said phosphor particles with said plasma such that said fluorine is supplied into a surface portion of said each phosphor particle of said plurality of phosphor particles.

5. A process for producing a plasma display panel, comprising:
providing a first plurality of electrodes and a plurality of ribs on a first substrate such that one electrode of said first plurality of electrodes is disposed between each pair of immediately adjacent ribs in said plurality of ribs;
applying phosphor particles in the form of a paste onto said first substrate to form a phosphor layer between each pair of immediately adjacent ribs in said plurality of ribs;
forming a fluorine-containing coating on a surface of said phosphor layer by irradiating said phosphor layer with a plasma including a fluorine radical such that fluorine is supplied to said phosphor layer;
positioning said first substrate relative to a second substrate having a second plurality of electrodes thereon such that discharge spaces are defined between said first and second substrates; and
filling said discharge spaces with a discharge gas.

6. The process according to claim 5, wherein
forming said fluorine-containing coating comprises irradiating said phosphor layer with said plasma such that said fluorine is supplied into a fluorine-containing pre-coating which is previously formed to cover said surface of said phosphor layer.

7. The process according to claim 6, wherein
said fluorine-containing pre-coating is formed by depositing onto said surface of said phosphor layer, by physical vapor deposition, a fluoride selected from the group consisting of magnesium fluoride, calcium fluoride, barium fluoride and lithium fluoride.

8. The process according to claim 5, wherein
forming said fluorine-containing coating comprises irradiating said phosphor layer with said plasma such that said fluorine is supplied into a surface portion of said phosphor particles forming said surface of said phosphor layer.

9. A process for producing a plasma display panel, comprising:
providing electrodes and ribs on a substrate such that one of said electrodes is between every two immediately adjacent ones of said ribs;
forming a fluorine-containing coating on a surface of each of phosphor particles by depositing fluorine-added silicon oxide onto said surface of each of said phosphor particles and then depositing silicon oxide onto said fluorine-added silicon oxide; then applying said phosphor particles in the form of a paste onto said substrate to form a phosphor layer between said ribs;

positioning said substrate relative to another substrate having electrodes thereon such that discharge spaces are defined between said substrates; and filling said discharge spaces with a discharge gas.

10. A process for producing a plasma display panel, comprising:

providing electrodes and ribs on a substrate such that one of said electrodes is between every two immediately adjacent ones of said ribs;

applying phosphor particles in the form of a paste onto said substrate to form a phosphor layer between said ribs;

forming a fluorine-containing coating on a surface of said phosphor layer by depositing fluorine-added silicon oxide onto said surface of said phosphor layer and then depositing silicon oxide onto said fluorine-added silicon oxide;

positioning said substrate relative to another substrate having electrodes thereon such that discharge spaces are defined between said substrates; and filling said discharge spaces with a discharge gas.

11. A process for producing a plasma display panel, comprising:

providing electrodes and ribs on a substrate such that one of said electrodes is between every two immediately adjacent ones of said ribs;

forming a fluorine-containing coating on a surface of each of phosphor particles by depositing a first layer of fluorine-added silicon oxide onto said surface of each of said phosphor particles and then depositing a second layer of silicon oxide onto said first layer, with said second layer containing substantially no fluorine; then applying said phosphor particles in the form of a paste onto said substrate to form a phosphor layer between said ribs;

positioning said substrate relative to another substrate having electrodes thereon such that discharge spaces are defined between said substrates; and filling said discharge spaces with a discharge gas.

12. A process for producing a plasma display panel, comprising:

providing electrodes and ribs on a substrate such that one of said electrodes is between every two immediately adjacent ones of said ribs;

applying phosphor particles in the form of a paste onto said substrate to form a phosphor layer between said ribs;

forming a fluorine-containing coating on a surface of said phosphor layer by depositing a first layer of fluorine-added silicon oxide onto said surface of said phosphor layer and then depositing a second layer of silicon oxide onto said first layer, with said second layer containing substantially no fluorine, such that a surface of each of said phosphor particles defining said surface of said phosphor layer is partially covered by said first layer and said second layer;

positioning said substrate relative to another substrate having electrodes thereon such that discharge spaces are defined between said substrates; and filling said discharge spaces with a discharge gas.

* * * * *